United States Patent
Bae et al.

(10) Patent No.: US 8,792,173 B2
(45) Date of Patent: *Jul. 29, 2014

(54) CHANGEABLE LIQUID LENS ARRAY AND METHOD OF MANUFACTURING THE SAME

(71) Applicant: Samsung Electronics Co., Ltd., Yeongtong-gu, Gyeonggi-do (KR)

(72) Inventors: Jung-mok Bae, Seoul (KR); Hong-seok Lee, Seongnam-si (KR); Hoon Song, Yongin-si (KR); Yong-joo Kwon, Seoul (KR); Jung-hoon Lee, Seoul (KR); Seung-yul Choi, Seoul (KR)

(73) Assignees: Samsung Electronics Co., Ltd., Suwon-si (KR); SNU R&DB Foundation, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/022,487

(22) Filed: Sep. 10, 2013

(65) Prior Publication Data

US 2014/0009815 A1    Jan. 9, 2014

Related U.S. Application Data

(63) Continuation of application No. 13/278,625, filed on Oct. 21, 2011, now Pat. No. 8,576,490.

(30) Foreign Application Priority Data

Oct. 22, 2010   (KR) .................. 10-2010-0103683

(51) Int. Cl.
*G02B 27/10* (2006.01)
*G02B 3/12* (2006.01)
*G02F 1/01* (2006.01)
*G02B 26/02* (2006.01)

(52) U.S. Cl.
USPC ............ 359/620; 359/665; 359/272; 359/228

(58) Field of Classification Search
USPC .......... 359/665, 666, 811–830, 272, 832, 619, 359/620, 228
See application file for complete search history.

(56) References Cited

U.S. PATENT DOCUMENTS

| | | | |
|---|---|---|---|
| 7,307,672 B2 | 12/2007 | Feenstra et al. | |
| 7,884,534 B2 | 2/2011 | Murakami et al. | |
| 7,994,617 B2 | 8/2011 | Arai et al. | |
| 8,416,503 B2* | 4/2013 | Hsieh | 359/665 |
| 8,520,286 B2* | 8/2013 | Clapp et al. | 359/270 |
| 2010/0295768 A1 | 11/2010 | Kwak et al. | |
| 2012/0099205 A1* | 4/2012 | Bae et al. | 359/620 |
| 2013/0201547 A1* | 8/2013 | Cho et al. | 359/290 |

* cited by examiner

*Primary Examiner* — Mohammed Hasan
(74) *Attorney, Agent, or Firm* — NSIP Law

(57) ABSTRACT

A changeable liquid lens array and a method of manufacturing the same. The changeable liquid lens array includes a substrate, a plurality of partition walls arrayed on the substrate and having a fluid travel path, cells defined by the plurality of partition walls, a first fluid comprised in the cells, a second fluid arranged on the first fluid, a first electrode arranged on at least one side surface of each of the partition walls, and a second electrode disposed to be separate from the partition walls. A shape of shape of an interface between the first fluid and the second fluid changes based on a voltage that is applied to the first electrode and the second electrode.

12 Claims, 10 Drawing Sheets

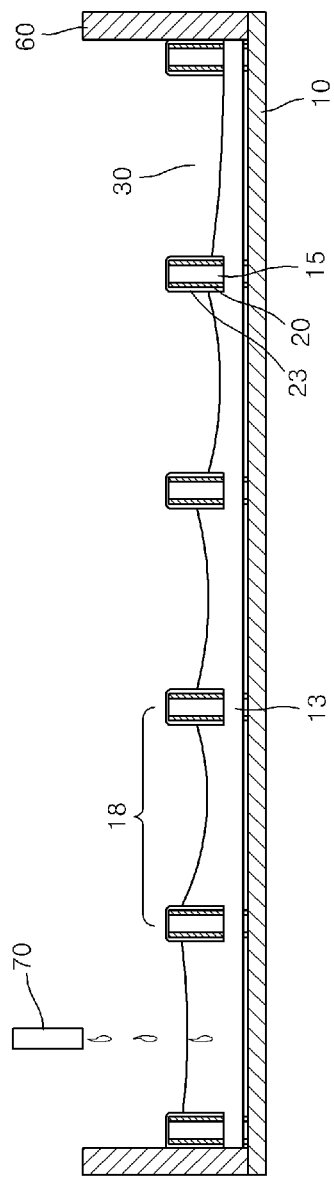

CHANGEABLE LIQUID LENS ARRAY AND METHOD OF MANUFACTURING THE SAME

CROSS-REFERENCE TO RELATED APPLICATIONS

This application is a continuation of application Ser. No. 13/278,625, filed on Oct. 21, 2011 now U.S. Pat. No. 8,317,328 B2, which claims the benefit of Korean Patent Application No. 10-2010-0103683, filed on Oct. 22, 2010, in the Korean Intellectual Property Office, the entire disclosures of which are incorporated herein by reference for all purposes.

BACKGROUND

1. Field

The following description relates to a changeable liquid lens array, and additionally, a lens array in which an interface between fluids changes in response to a voltage applied thereto, and a method of manufacturing the changeable liquid lens array.

2. Description of the Related Art

Electro-wetting includes coating a hydrophobic insulating material on an electrode, contacting a conductive fluid and a non-conductive fluid, and controlling a surface tension of the conductive fluid by applying a voltage to the conductive fluid, so that a contact angle of the conductive fluid and a shape of an interface between the conductive fluid and the non-conductive fluid are changed. In response to a voltage being applied to the conductive fluid and the non-conductive fluid, a hydrophobic interface of the conductive fluid becomes hydrophilic, and the contact angle of the conductive fluid becomes small, thereby resulting in the conductive fluid pushing out the non-conductive fluid, and further resulting in the interface between the conductive fluid and the non-conductive fluid having a lens shape.

In a changeable liquid lens array using the electro-wetting technology, it is necessary to uniformly dose the conductive fluid and the non-conductive fluid or to make the interface between the conductive fluid and the non-conductive fluid flat in an initial status.

SUMMARY

In one general aspect, there is provided a changeable liquid lens array. The changeable liquid lens array includes a substrate, a plurality of partition walls arrayed on the substrate and having a fluid travel path, cells defined by the plurality of partition walls, a first fluid comprised in the cells, a second fluid arranged on the first fluid, a first electrode arranged on at least one side surface of each of the partition walls, and a second electrode disposed to be separate from the partition walls. A shape of shape of an interface between the first fluid and the second fluid changes based on a voltage that is applied to the first electrode and the second electrode.

The fluid travel path may be arranged at lower portions of the partition walls.

The fluid travel path may be arranged between neighboring partition walls.

Ends of the partition walls that are adjacent to the fluid travel path may have a curved shape or a tapered shape.

The cells may be arrayed in a two-dimensional (2D) matrix.

The changeable liquid lens may include a closing unit arranged on a bottom surface of the second electrode so as to block the fluid travel path.

A spacer may be arranged between the substrate and the second electrode so as to support the second electrode. The height of the spacer is greater than a height of the partition walls.

The second fluid may be arranged above the partition such that the second fluid is shared between the cells.

When the first fluid and the second fluid are dosed to the cells, the first fluid and the second fluid may move due to a capillary force via the fluid travel path.

The first fluid may be a non-conductive fluid, and the second fluid may be a conductive fluid.

The first fluid may be oil, and the second fluid may be water or salt water.

The changeable liquid lens array may include an insulating film arranged on the first electrode and comprising a hydrophobic material.

The insulating film may be philic to the first fluid and may be phobic to the second fluid.

In another aspect, a method of manufacturing a changeable liquid lens array is provided. The method includes forming cells on a substrate by arraying a plurality of partition walls having a fluid travel path, disposing a spacer having a height greater than a height of the partition walls so as to surround the partition walls, filling the cells with a first fluid, injecting a second fluid into the first fluid, allowing the second fluid to travel to the neighboring cells via the fluid travel path, and filling the cells by the second fluid, and allowing the first fluid to be arranged on the second fluid.

The filling of the cells by the first fluid may be performed by using a One Drop Filling (ODF) method.

The second fluid may be injected into the first fluid by using an injector.

The second fluid may travel via the fluid travel path due to a capillary force.

In response to the second fluid filling the cells, an interface between the first fluid and the second fluid may become flat.

The interface may become flat based on at least a reduction of a capillary force.

The capillary force may be a force between each of the partition walls and at least one of the first fluid and the second fluid.

The first fluid may be a conductive fluid, and the second fluid may be a non-conductive fluid.

The first fluid may be water or salt water, and the second fluid may be oil.

The method may include coating an insulating film comprising a hydrophobic material so as to surround the partition walls.

In another aspect, an electronic device is provided. The electronic device includes a changeable liquid lens array having a substrate, a plurality of partition walls arrayed on the substrate and having a fluid travel path, cells defined by the plurality of partition walls, a first fluid comprised in the cells, a second fluid arranged on the first fluid, a first electrode arranged on at least one side surface of each of the partition walls, and a second electrode disposed to be separate from the partition walls. A shape of shape of an interface between the first fluid and the second fluid changes based on a voltage that is applied to the first electrode and the second electrode.

The electronic device may be one of a television, a computer monitor, a portable computer, a mobile communication device, and the like.

In another aspect, a changeable liquid lens array is provided. The changeable liquid lens array includes a plurality of cells defined by a plurality of partition walls operatively disposed on a substrate. Each of the plurality of cells is filled with a first fluid, a second fluid is disposed on the first fluid; and the partition walls have or are arranged so as to define a fluid travel path through which the first fluid travels such that in an equilibrium state without voltage being applied, an interface between the first fluid and the second fluid is flat.

A shape of the interface between the first fluid and the second fluid may change in response to a voltage being applied to the changeable liquid lens array.

A voltage may be operatively applied to at least one of the first liquid and the second liquid.

A voltage may be applied through electrodes that are disposed on at least a portion of the plurality of partition walls.

In another aspect, an electronic device is provided. The electronic device includes a changeable liquid lens array having a plurality of cells defined by a plurality of partition walls operatively disposed on a substrate. Each of the plurality of cells is filled with a first fluid, a second fluid is disposed on the first fluid; and the partition walls have or are arranged so as to define a fluid travel path through which the first fluid travels such that in an equilibrium state without voltage being applied, an interface between the first fluid and the second fluid is flat.

The electronic device may be one of a television, a computer monitor, a portable computer, a mobile communication device, and the like.

Other features and aspects may be apparent from the following detailed description, the drawings, and the claims.

BRIEF DESCRIPTION OF THE DRAWINGS

FIGS. 7A through 7D are diagrams illustrating an example of a method of manufacturing a changeable liquid lens array.

Figure 1:
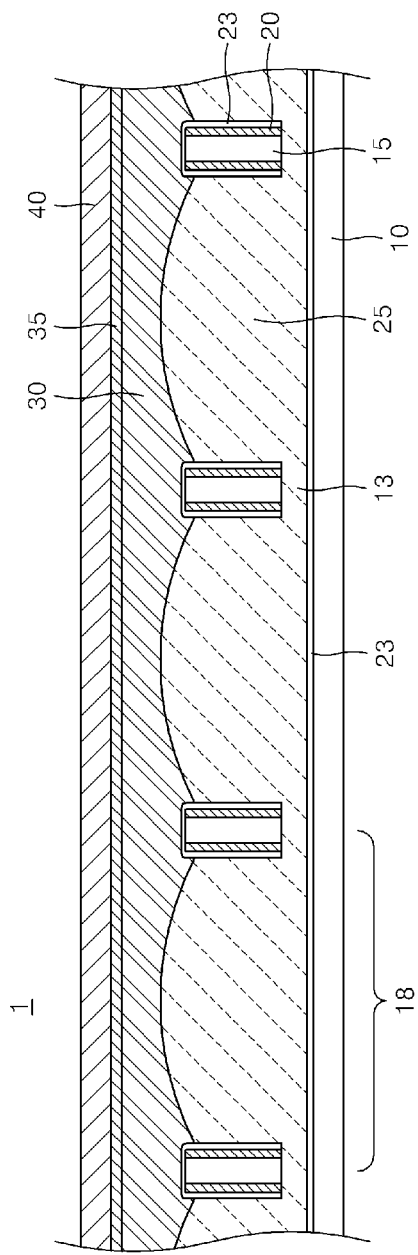
FIG. 1 is a diagram illustrating a changeable liquid lens array.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a diagram illustrating a changeable liquid lens array 1. Referring to FIG. 1, the changeable liquid lens array 1 may include a first substrate 10, a plurality of partition walls 15 arrayed on the first substrate 10, and a plurality of cells 18 defined by the partition walls 15. The cells 18 may be arrayed in a two-dimensional (2D) matrix. The cells 18 may be filled with a first fluid 25. For example, the cells may be filled with the first fluid 25 up to a height of the partition walls 15. Each of the partition walls 15 may include a fluid travel path 13 through which a fluid may travel. The fluid travel path 13 may have one of various shapes and may be arranged at various positions.

Figure 2:
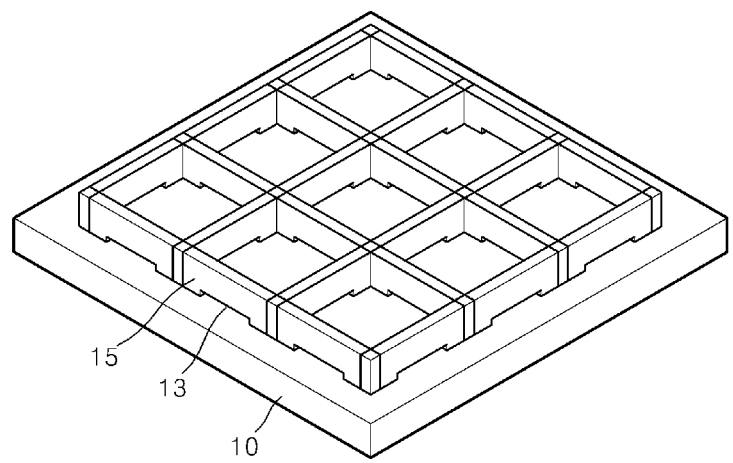
FIGS. 2 through 5 are diagrams that illustrate various examples of a partition wall of the changeable liquid lens.
Figure 3:
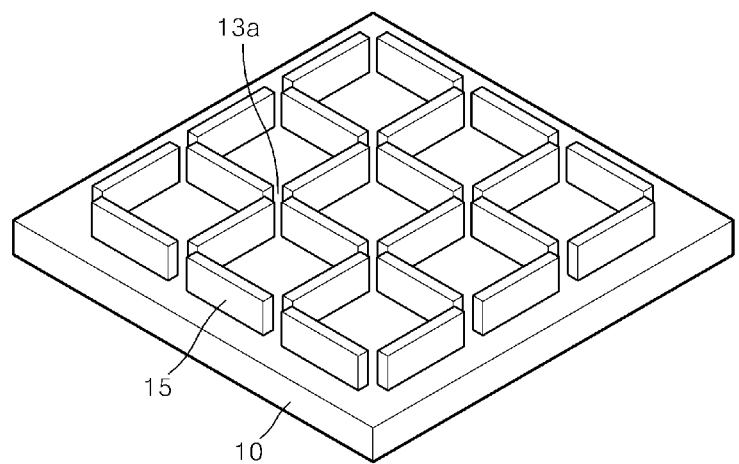
Figure 4:
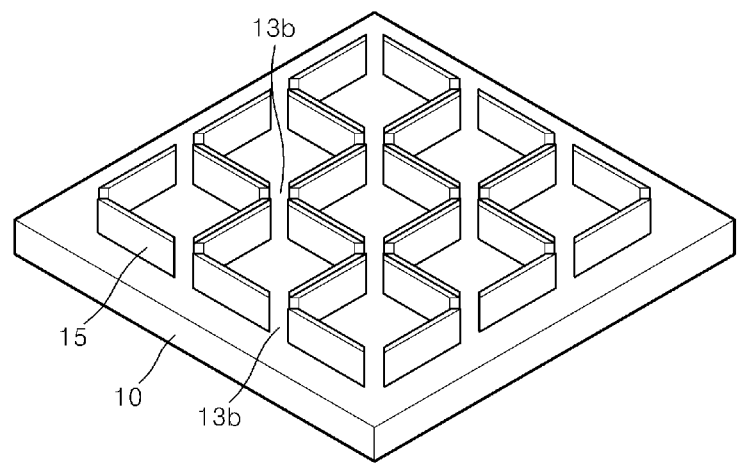
Figure 5:
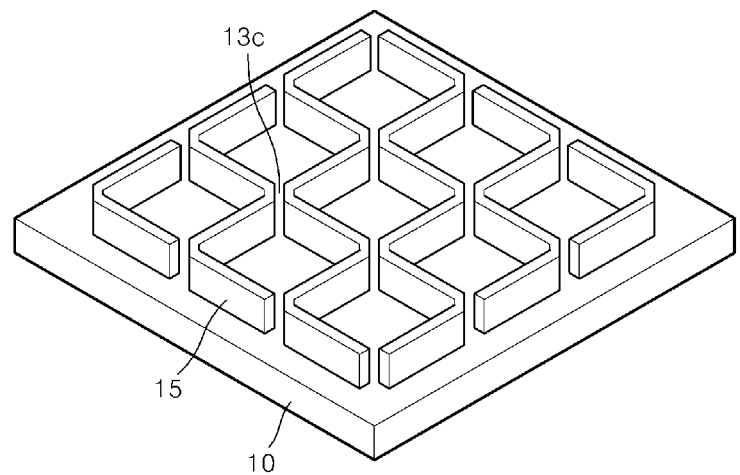

FIGS. 2 through 5 are diagrams illustrating a partition wall of the changeable liquid lens. For example, FIGS. 2 through 5 further illustrate examples of the fluid travel path 13. As an example, FIG. 2 illustrates that the fluid travel path 13 may be arranged at a lower portion of the partition walls 15. As another example, FIG. 3 illustrates that the partition walls 15 may be disposed in a rectangular array, and a fluid travel path 13a may be arranged between the neighboring partition walls 15. FIG. 4 also illustrates an example in which a fluid travel path 13b is arranged between neighboring partition walls 15. In this example, an end of the partition walls 15 has a tapered shape. However, a shape of the partition walls 15 is not limited thereto, and thus, may have, for example, a curved shape or a sloped shape. FIG. 5 illustrates an example of a rectangular partition wall structure in which a fluid travel path 13c is arranged at a pair of corners facing each other.

Referring back to FIG. 1, as a non-limiting example, a second substrate 40 may be disposed upwardly separated from the partition walls 15. A second fluid 30 may be filled in a space between the partition walls 15 and the second substrate 40. Because the space between the partition walls 15 and the second substrate 40 is not blocked by the partition walls 15 of the cells 18, the second fluid 30 may be travel between the cells 18.

The first fluid 25 and the second fluid 30 may be two types of fluids that do not mix with each other. As a non-limiting example, the first fluid 25 may be a non-conductive fluid, and the second fluid 30 may be a conductive fluid. For example, the first fluid 25 may be oil, and the second fluid 30 may be water or salt water.

In addition, electrodes may be arranged to apply a voltage to the first fluid 25 and the second fluid 30. For example, a first electrode 20 may be arranged on one or more side surfaces of each partition wall 15, and a second electrode 35 may be arranged below the second substrate 40. As an example, an insulating film 23 may be arranged to surround the first electrode 20. For example, the insulating film 23 may include a hydrophobic material. As another example, it is also possible that a hydrophobic film is separately coated on the insulating film 23. The insulating film 23 may also be coated on the first substrate 10. In such examples, because the first electrode 20 is electrically insulated by the insulating film 23 that includes the hydrophobic material, the partition walls 15 may be philic to the first fluid 25 and may be phobic to the second fluid 30. As an example, the first substrate 10 and the second substrate 40 may be transparent substrates. As an example, the first electrode 20 and the second electrode 35 may be transparent electrodes. According to another example, the second electrode 35 may be arranged without the second substrate 40. For example, the second electrode 35 may effectively act as a boundary to the second fluid 30 so as to be bound the second fluid 30 between the second electrode 35 and the first fluid 25.

As an example, an electro-wetting method may be used to change an interface between the first fluid 25 and the second fluid 30 of the changeable liquid lens array 1 of FIG. 1. When the interface between the first fluid 25 and the second fluid 30 is changed, a focal length may be changed. As an example, cell 18 of the changeable liquid lens array 1 has a rectangular pillar shape, however, a shape of each cell 18 is not limited thereto. For example, the shape of each cell 18 may have one of various shapes including a round pillar, an octagonal pillar, or the like. As another example, each cell 18 may have a long rectangular shape whose sides have different lengths so that, when each cell 18 has a lens shape due to a change of the interface between the first fluid 25 and the second fluid 30, each cell 18 may function as a cylindrical lens.

When the first fluid 25 and the second fluid 30 are in a balanced status, the interface between the first fluid 25 and the second fluid 30 is positioned above the partition walls 15, and edges of the interface between the first fluid 25 and the second fluid 30 contact surfaces of the partition walls 15. However, when a voltage is applied to the first fluid 25 and the second fluid 30, electro-wetting occurs on the surfaces of the partition walls 15 and thus the interface between the first fluid 25 and the second fluid 30 may be changed.

For example, when the first fluid 25 and the second fluid 30 are dosed to the cells 18, a fluid may travel via the fluid travel path 13 of the partition walls 15 and then may move to all of the cells 18 by virtue of a capillary force generated by the fluid travel path 13 and the partition walls 15. Due to the capillary force, the fluid may be automatically and uniformly dosed to all of the cells 18. For example, an amount of the fluid in each cell 18 may affect an electro-wetting characteristic and a lens shape of each cell 18. Characteristics of cell lenses may be the same by uniformly dosing the fluid among the cells 18. For example, initially, the interface between the first fluid 25 and the second fluid 30 that are self-dosed may be automatically flat when a voltage is not applied thereto. Such an example will be described later.

Figure 6A:
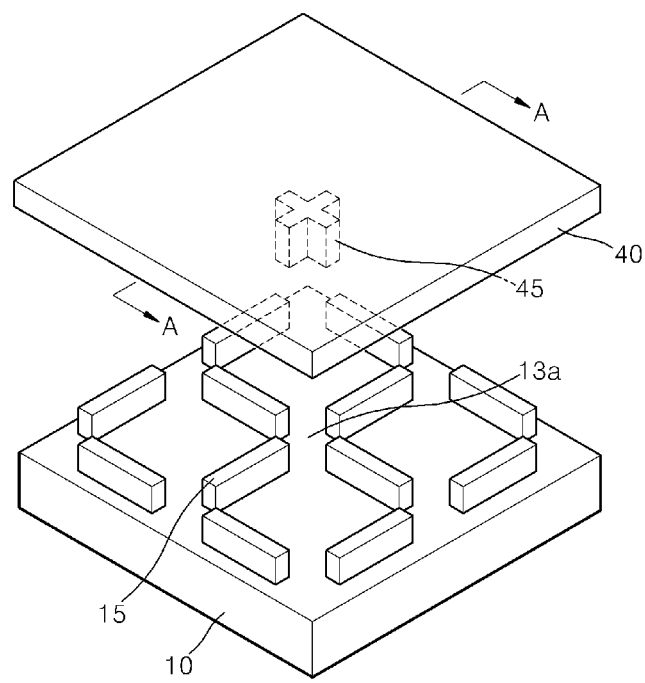
FIG. 6A is diagram illustrating an example of a changeable liquid lens array.
Figure 6B:
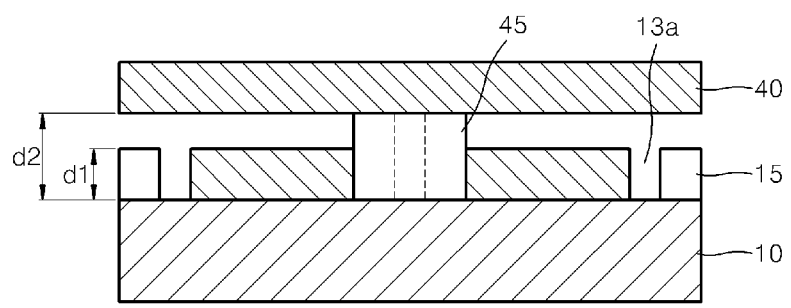
FIG. 6B is a diagram illustrating the changeable liquid lens array of FIG. 6A, taken along a line A-A.

FIG. 6A is diagram illustrating an example of a changeable liquid lens array. The example of a changeable liquid lens array illustrated in FIG. 6A may include a closing unit 45 arranged below a second substrate 40. Because the other features of the example illustrated in FIG. 6A are similar to those described with respect to the example illustrated in FIG. 1, a detailed description thereof is omitted. Referring to FIG. 6A, a fluid travel path 13a may be arranged between neighboring partition walls 15. As an example, the closing unit 45 may block the fluid travel path 13a. The closing unit 45 may have one of various shapes according to a shape of the fluid travel path 13a. For example, the shape of the closing unit 45 may be selected to correspond to the shape of the fluid travel path 13a such that the closing unit 45 operatively blocks or closes the fluid travel path 13a. FIG. 6B is a diagram illustrating an example of the changeable liquid lens array illustrated in FIG. 6A, taken along a line A-A. Referring to FIG. 6B, a height dl of each partition wall 15 may be less than a height d2 of the closing unit 45. For the sake of clarity, FIG. 6B does not illustrate electrodes or an insulating film are omitted. However, examples of a changeable liquid lens array may include electrodes and an insulating film as described above Hereinafter, a method of manufacturing a changeable liquid lens array according to another example will be described. Referring to FIG. 7A, partition walls 15 are formed on a first substrate 10. As an example, the first substrate 10 may be a transparent substrate. The partition walls 15 may be formed by patterning polymer such as, for example, su-8. The partition walls 15 may also be formed by, for example, electroplating with a metal by using a mold. As an example, at the time the partition walls 15 are formed, a fluid travel path 13 may be formed in the partition walls 15. As another example, a spacer 60 may be formed to surround the first substrate 10. For example, a height of the spacer 60 may be greater than a height of the partition walls 15. A first electrode 20 may be formed on side surfaces of each partition wall 15. As an example, the first electrode 20 may be formed by depositing indium tin oxide (ITO) on an entire surface of each partition wall 15. As another example, the first electrode 20 may be formed by forming a conductive material including a metal only on the side surfaces of each partition wall 15. As another example, the first electrode 20 may be formed on each of four partition walls forming one cell. After the first electrode 20 is formed, an insulating film 23 may be formed on top surfaces of the first electrode 20 and the first substrate 10. The insulating film 23 may be formed, for example, by coating parylen, Teflon, Cytop, fluoro polymer, or the like.

Figure 7B:
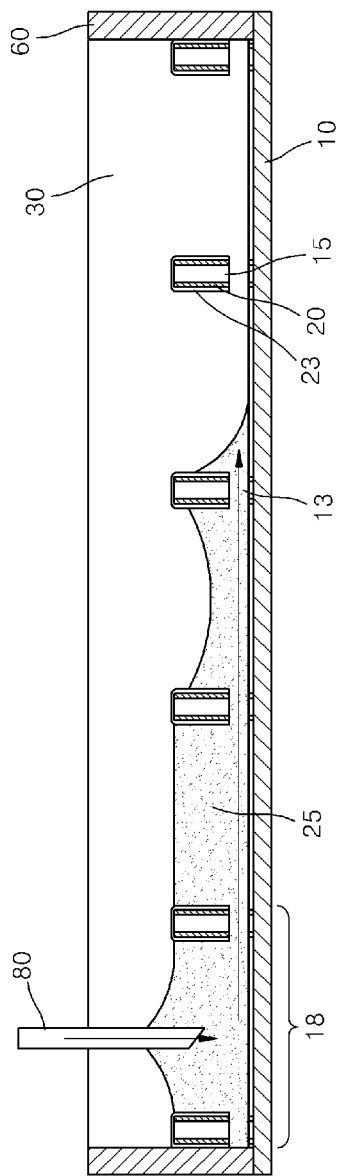
Figure 7C:
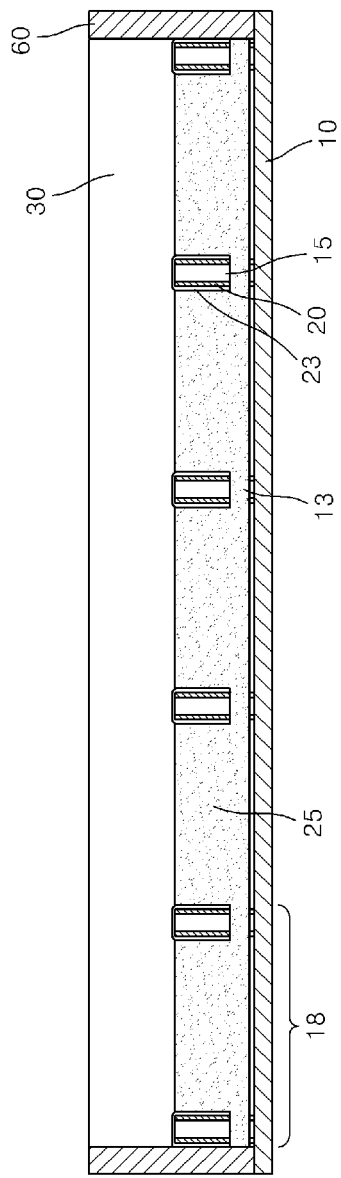

A second fluid 30 is filled in cells 18 defined by the partition walls 15. As an example, the second fluid 30 may be filled by using a One Drop Filling (ODF) method. The ODF method mat be used to load a liquid crystal, and may be performed such that the second fluid 30 is dropped in each cell 18 by using a high-speed injector 70. After each cell 18 is filled with the second fluid 30, as illustrated in FIG. 7B, a first fluid 25 may be injected into the second fluid 30. For example, the first fluid 25 may be injected by using an injector 80. The first fluid 25 may be filled in all of the cells 18 due to a capillary force via the fluid travel path 13 of the partition walls 15. Because the first fluid 25 and the second fluid 30 do not mix, the second fluid 30 moves upward as each cell 18 is filled with the first fluid 25. Also, because there is one space above the partition walls 15, the second fluid 30 may freely travel in all of the cells 18. Thus, when the first fluid 25 moves to all of the cells 18 via the fluid travel path 13 due to the capillary force, and pushes the second fluid 30 upward, the second fluid 30 may freely travel in the space above the partition walls 15. As illustrated in FIG. 7C, the first fluid 25 may be filled up to a height of each partition wall 15.

Figure 7D:
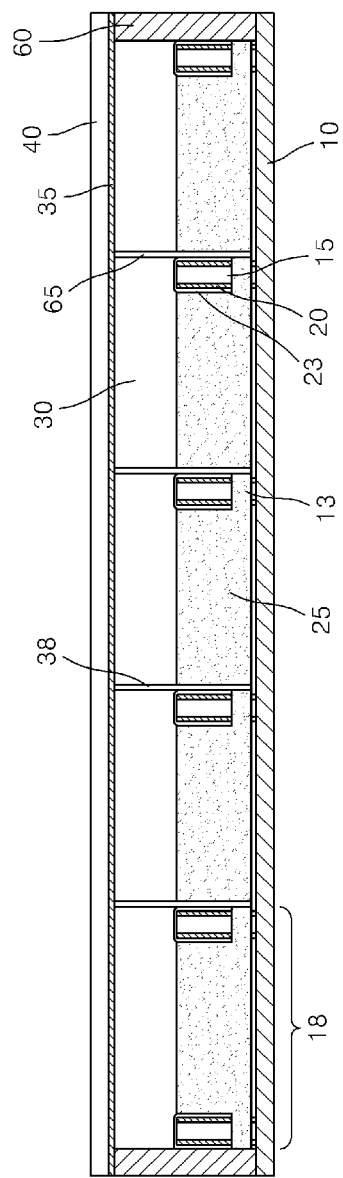

Referring to FIG. 7D, after a second electrode 35 is formed on a second substrate 40, the first substrate 10 and the second substrate 40 may be combined. The second substrate 40 may be supported by the spacer 60. As an example, the second electrode 35 may be a transparent electrode. As an example, a closing unit 38 may be further arranged on the second electrode 35 so as to block the fluid travel path 13. The closing unit 38 may block the fluid travel path 13 so as to prevent a case in which the first fluid 25 travels after the first fluid 25 and the second fluid 30 are completely filled. For example, the closing unit 38 may have an area corresponding to an area of the fluid travel path 13 and may be formed at a position corresponding to a position of the fluid travel path 13. In other portions, the closing unit 38 may have a minimum area so as not to block the space between the partition walls 15 and the second substrate 40. For example, the closing unit 38 may be selectively arranged, and the closing unit 38 may vary according to a shape and position of the fluid travel path 13.

Figure 8:
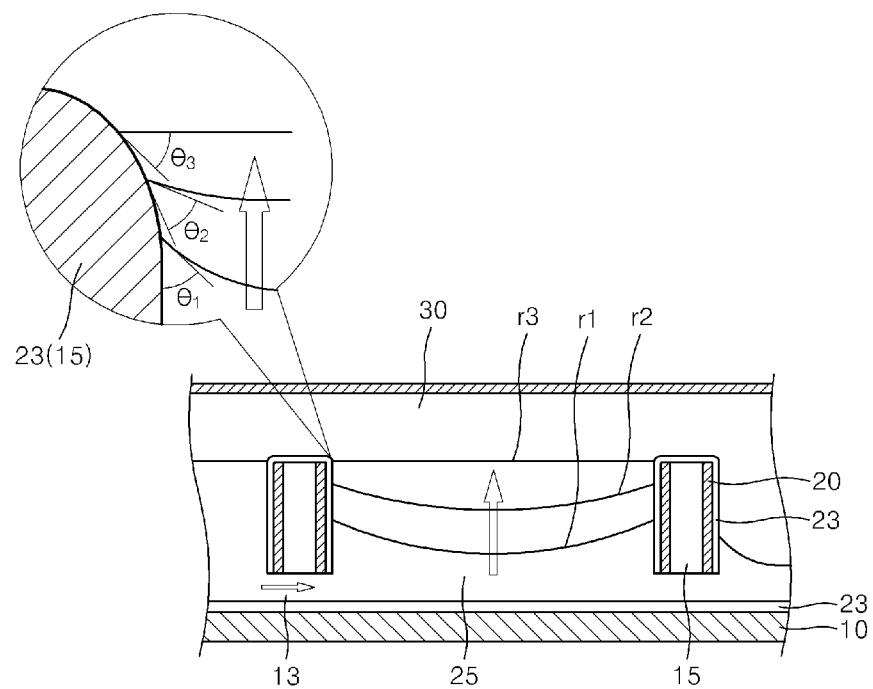
FIG. 8 is a diagram illustrating an example of a process by which cells are filled with a fluid by using a method of manufacturing a changeable liquid lens array.

FIG. 8 is a diagram that illustrates an example in which an interface between a first fluid 25 and a second fluid 30 is changed according to an injection height, when the first fluid 25 is inserted after the second fluid 30 is filled. For example, when the first fluid 25 travels via a fluid travel path 13, the first fluid 25 is filled in each cell due to a capillary force so that the interface between the first fluid 25 and the second fluid 30 goes upward. As the interface between the first fluid 25 and the second fluid 30 goes upward in the order of r1→r2→r3, an angle between the interface and a side surface of each partition wall 15 is increased in the order of $\theta 1 < \theta 2 < \theta 3$, so that the capillary force disappears. Eventually, the interface between the first fluid 25 and the second fluid 30 may become flat. According to this example, by filling the first fluid 25 in each cell via the fluid travel path 13, a flat status between the first fluid 25 and the second fluid 30 may be maintained without application of an initial voltage thereto. Further, as described above, it is not necessary to apply a voltage in order to obtain the flat status between the first fluid 25 and the second fluid 30. Thus, energy consumption may be reduced. For example, when the changeable liquid lens array according to the one or more examples is employed in a two-dimensional (2D)/three-dimensional (3D) display, it is not necessary to initially apply a voltage so as to obtain a flat status for a 2D image.

Figure 9:
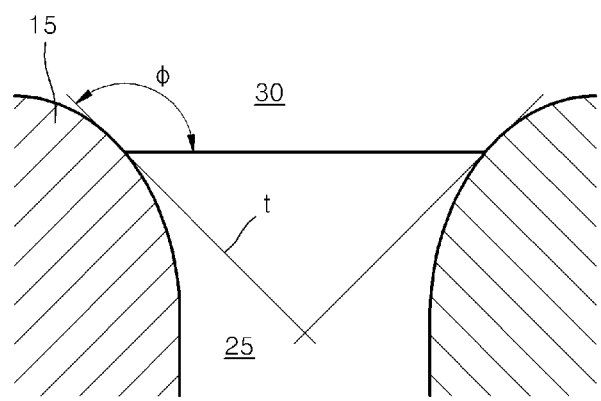
FIG. 9 is a diagram illustrating an example of a change in a capillary force in response to cells being filled with a fluid by using a method of manufacturing a changeable liquid lens array.

Meanwhile, as illustrated in FIG. 9, an end of a partition wall may have a curved shape or a sloped shape. In such examples when an end of a partition wall 15 has a curved shape or a sloped shape, a contact angle ϕ between a second fluid 30 and a tangent plane t of the partition wall 15 may be greater than 90 degree. When the contact angle ϕ is greater than 90 degree, a margin in which an interface between a first fluid and a second fluid may maintain its flat status may be increased, compared to a case in which the contact angle ϕ is 90 degree (that is, when the end of the partition wall 15 has a right-angle shape).

Figure 10A:
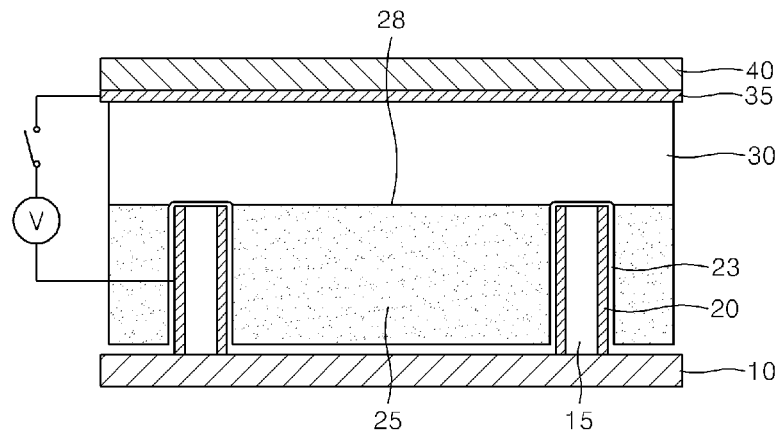
FIGS. 10A and 10B are diagrams illustrating examples of operations of a changeable liquid lens array.
Figure 10B:
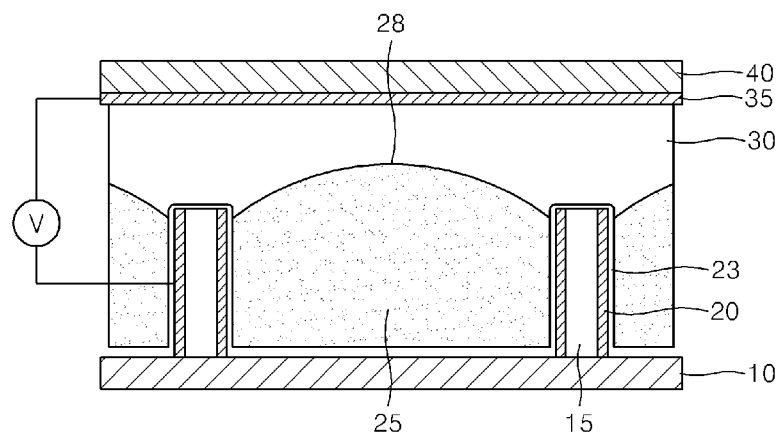

FIGS. 10A and 10B are diagrams illustrating operations of a changeable liquid lens array. For example, FIGS. 10A and 10B correspond to a case in which a fluid travel path has a structure shown in FIG. 3, and is not shown in cross-sections of the changeable liquid lens array.

FIG. 10A illustrates an example of the changeable liquid lens array without having an application of a voltage thereto. Referring to FIG. 10A, an interface 28 between a first fluid 25 and a second fluid 30 may be flat. As described above, is the flat interface is formed because a uniform amount of the first fluid 25 is automatically dosed in each cell via the fluid travel path, and the interface 28 between the first fluid 25 and the second fluid 30 may remain flat due to a capillary force without having application of a voltage thereto. FIG. 10B illustrates an example of the changeable liquid lens array having application of a voltage thereto. For example, referring to FIG. 10B, when the voltage is applied to the changeable liquid lens, the interface 28 between the first fluid 25 and the second fluid 30 moves upward so that the interface 28 may form a curved surface and then may have a lens shape. Based on a level of the voltage applied to the changeable liquid lens, a curvature may be adjusted, and according to the curvature, a focal length may be changed.

As an example, the changeable liquid lens array according to the one or more examples may adjust an exit path of light and thus may be applied to a 3D image display that does not require glasses. For example, when a voltage is not applied to a first fluid and a second fluid, an interface between the first fluid and the second fluid is flat so that light may straightly pass through the interface, and a 2D image may be displayed. However, when a voltage is applied to the first fluid and the second fluid, and then the interface between the first fluid and the second fluid has a lens shape, a 3D image may be displayed.

Also, the changeable liquid lens array according to the one or more examples may be attached on a multi-cell plate for a biochemical experiment, and thus, may be used in an optical analysis device capable of simultaneously observing optical changes of cells.

As an example, the changeable liquid lens may have a fluid travel path between cells so that fluids may be automatically injected. When the fluids are injected, an amount of the injected fluids may be uniform in the cells due to a capillary force. An interface between the fluids may be flat without initial application of a voltage thereto. Thus, it is possible to reduce an energy consumption that is necessary to obtain an initial flat status.

The method of manufacturing the changeable liquid lens array according to the one or more examples may be simplified due to the fact that the fluids may be automatically distributed via the fluid travel path.

It should be understood that the exemplary examples described herein should be considered in a descriptive sense only and not for purposes of limitation. Descriptions of features or aspects within each example should typically be considered as available for other similar features or aspects in other examples.

According to another aspect, there is provided a changeable liquid lens array in which a shape of an interface between fluids is changed by a voltage applied thereto.

According to another aspect, provided is a method of manufacturing changeable liquid lens array, whereby a fluid in each cell can be uniformly dosed.

The changeable liquid lens array described in the examples herein may be included in an electronic apparatus. For example, the resonator may be or may be included in a terminal such as a mobile terminal, a smart phone, a computer, a tablet, a camera, a home appliance, a sensor, and the like. As a non-exhaustive illustration only, a terminal described herein may refer to a computer or computing system, mobile devices such as a cellular phone, a personal digital assistant (PDA), a digital camera, a portable game console, an MP3 player, a portable/personal multimedia player (PMP), a handheld e-book, a portable lab-top PC, a global positioning system (GPS) navigation, and devices such as a desktop PC, a high definition television (HDTV), an optical disc player, and the like consistent with that disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electrowetting device comprising:
a substrate; partition walls arrayed on the substrate and having a fluid travel path; cells defined by the partition walls; a first fluid comprised in the cells; and a second fluid arranged on the first fluid; and wherein the first fluid is a non- conductive fluid, and the second fluid is a conductive fluid.

2. The electrowetting device of claim 1, further comprising:
at least one electrode applying a voltage to the first and second fluids applied to a first electrode and a second electrode.

3. The electrowetting device of claim 2, further comprising:
an insulating film arranged on the at least one electrode, wherein the insulating film comprises a hydrophobic material.

4. The electrowetting device of claim 3, wherein the insulating film is philic to the first fluid and is phobic to the second fluid.

5. The electrowetting device of claim 1, wherein the fluid travel path is arranged at lower portions of the partition walls.

6. The electrowetting device of claim 1, wherein the fluid travel path is arranged between neighboring partition walls.

7. The electrowetting device of claim 6, wherein ends of the partition walls that are adjacent to the fluid travel path have a curved shape or a tapered shape.

8. The electrowetting device of claim 1, wherein the cells are arrayed in a two-dimensional (2D) matrix.

9. The electrowetting device of claim 1, further comprising:
   a closing unit to block the fluid travel path.

10. The electrowetting device of claim 1, wherein the second fluid is arranged above the partition such that the second fluid is shared between the cells.

11. The electrowetting device of claim 1, wherein, when the first fluid and the second fluid are dosed to the cells, the first fluid and the second fluid move due to a capillary force via the fluid travel path.

12. The electrowetting device of claim 1, wherein the first fluid is oil, and the second fluid is water or salt water.

* * * * *